United States Patent [19]

Woerner et al.

[11] Patent Number: 4,924,975
[45] Date of Patent: May 15, 1990

[54] SHOCK ABSORBER WITH IMPROVED DYNAMIC SEALING

[75] Inventors: Pierre Woerner, Fontenay-Aux-Roses; Jean-Pierre Hainaut, La Queue-en-Brie, both of France

[73] Assignee: Messier-Hispano-Bugatti, France

[21] Appl. No.: 309,265

[22] Filed: Feb. 13, 1989

[30] Foreign Application Priority Data

Mar. 9, 1988 [FR] France .................. 88 03037

[51] Int. Cl.⁵ .............................................. F16F 9/36
[52] U.S. Cl. .................... 188/322.18; 267/64.13; 272/72
[58] Field of Search ............... 188/269, 271, 279, 314, 188/322.11, 322.13, 322.16, 322.18, 322.19; 267/64.13, 64.15, 64.26; 277/72, 74; 384/15

[56] References Cited

U.S. PATENT DOCUMENTS

| 1,861,755 | 6/1932 | Rasmussen | 277/72 X |
| 4,136,886 | 1/1979 | Sjoholm et al. | 277/72 |
| 4,662,486 | 5/1987 | Stenberg | 188/322.18 X |

FOREIGN PATENT DOCUMENTS 0252825 1/1988 European Pat. Off. .
702160 1/1941 Fed. Rep. of Germany .
1807614 6/1969 Fed. Rep. of Germany .
3321084 12/1984 Fed. Rep. of Germany .
709327 5/1931 France .
1194294 5/1959 France .
2313604 12/1976 France .

Primary Examiner—Duane A. Reger
Attorney, Agent, or Firm—Sixbey, Friedman, Leedom & Ferguson

[57] ABSTRACT

The shock absorber of the invention comprises a struct (1) in which a sliding rod (4) is mounted, with an annular chamber (17) being defined between the strut and the sliding rod. According to the invention, the shock absorber includes at least one support bearing (10) between the strut and the sliding rod in the vicinity of the opening (3) in the strut, and a sealing bearing (12) at a distance from the support bearing (10) and disposed at a level which corresponds to the top portion of the sliding rod when the shock absorber is in its extended position, with the sealing bearing (12) also having a side which is in contact with the annular chamber (17) and sporting at least two sealing rings (14) which are separted by a groove (13) which is connected to the annular chamber via a balance channel (16) capable of being closed by a cock (19).

4 Claims, 2 Drawing Sheets

SHOCK ABSORBER WITH IMPROVED DYNAMIC SEALING

The present invention relates to a shock absorber with improved dynamic sealing.

BACKGROUND OF THE INVENTION

Shock absorbers, and in particular the shock absorbers integrated in aircraft landing gear, generally include a strut with a rod slidably mounted in the opening therein, with the rod and the strut together delimiting an internal volume containing a gas under pressure and a shock absorbing liquid; the rod being mounted to slide in sealed manner relative to the strut over a maximum penetration stroke.

If the shock absorber is to operate properly, it is necessary to prevent the shock absorbing liquid from leaking, and it is therefore particularly important to have a very effective sealing device available.

An object of the present invention is to propose a shock absorber including a structure suitable for providing a high degree of dynamic sealing even after the shock absorber has been through a large number of cycles.

SUMMARY OF THE INVENTION

In order to achieve this object, the present invention provides a shock absorber of the type described above and further comprising means for delimiting an annular chamber which is variable as a function of the degree to which the sliding rod penetrates into the strut and which communicates with the internal volume, said shock absorber comprising at least one support bearing between the strut and the sliding rod in the vicinity of the opening of the strut, and a sealing bearing at a distance from the support bearing and disposed at a level corresponding to a top portion of the sliding rod when the shock absorber is in the extended position, the sealing bearing having one side in contact with the annular chamber, and supporting at least two sealing rings separated by a groove connected to the annular chamber via a balance channel including balance channel shut-off means which are accessible from outside the strut.

Thus, by virtue of the gap between the sealing bearing and the opening of the strut, the shear force on the sealing rings is reduced and the corresponding wear of the sealing rings is minimized. Further, opening or closing the balance channel shut-off means makes it possible to put the sealing rings into service successively, thereby extending the real effective lifetime of the sealing device.

In an advantageous version of the invention applied to a shock absorber, in which the sealing rings are carried by the strut and make contact with an outside surface of the sliding rod, the sealing bearing is at a distance from the support bearing which is not less than the maximum stroke of the sliding rod. Thus, the portion of the sliding rod which faces the sealing rings remains continuously protected against external pollution regardless of the extension or compression movements of the shock absorber. In particular, the portion of the sliding rod facing the sealing rings is thus protected against scratching which would give rise to leaks of shock absorbing liquid.

In another advantageous aspect of the invention applied to a shock absorber in which the sealing rings are carried by the sliding rod and make contact with a dipping rod which is fixed to the strut, the balance channel shut-off means extend into an intermediate space between the strut and the dipping rod, and the strut includes a lateral opening. Preferably, said lateral opening in the strut is disposed at a level corresponding to the level of the shut-off means when the shock absorber is subjected to an average static load. Thus, by small adjustments to its inflation pressure, it is possible to bring the balance channel shut-off means face-to-face with said opening, and the maneuver the shut-off means.

BRIEF DESCRIPTION OF THE DRAWINGS

An embodiment of the invention is described by way of example with reference to the accompanying drawings, in which.

MORE DETAILED DESCRIPTION

Figure 1:
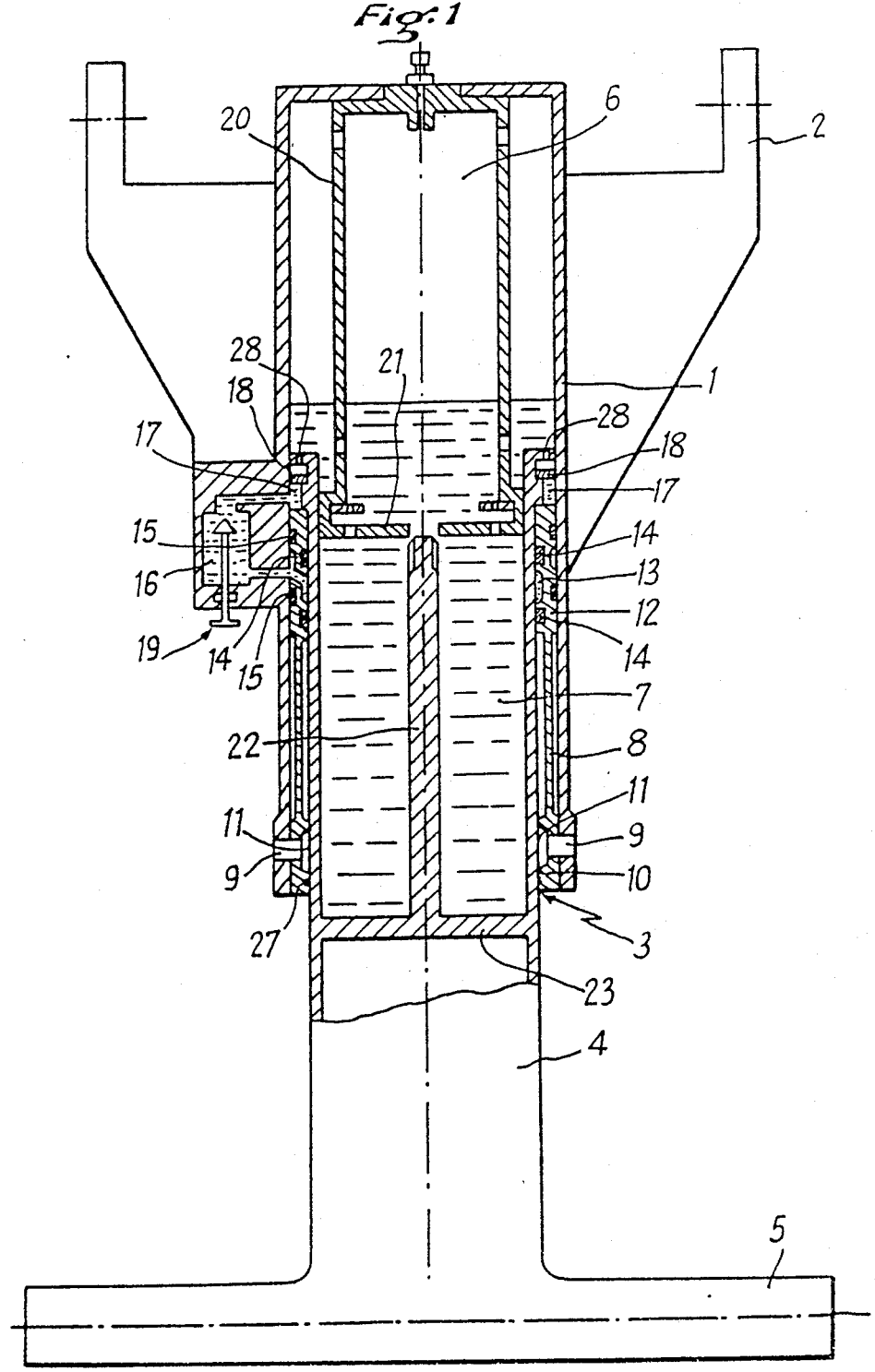
FIG. 1 is a view partially in axial section through a first embodiment of the invention.

With reference to FIG. 1, a shock absorber in accordance with the invention comprises a strut 1 constituting a landing gear leg and provided, for this purpose, with means 2 for fixing it to be structure of an aircraft. The bottom end of the strut 1 has an opening 3 in which a sliding rod 4 is mounted with the bottom end of the rod having a transverse shaft 5 for carrying the wheels of the landing gear. Together with the strut 1, the sliding rod 4 defines an internal volume 6 containing a gas under pressure and a shock absorbing liquid 7. In the embodiment of FIG. 1, the sliding rod 4 is retained inside the strut by a cylindrical sleeve 8 which is fixed to the strut by means 9. The bottom of the sleeve 8 has a thickening occupying the vicinity of the opening 3 to the strut and constituting a support bearing 10. The inside face of the support bearing 10 includes an annular groove 11 for receiving grease in order to facilitate the sliding of the sliding rod 4, and a scraper 27 for preventing dust and other pollutants from moving up into the sleeve 8. The top end of the sleeve 8 includes a thickening 12 forming a sealing bearing and including an annular groove 13 facing the outside surface of the sliding rod 4, two dynamic sealing rings 14 disposed on either side of the annular groove 13, and two static sealing rings 15 disposed between the outside surface of the sealing bearing 12 and the facing inside surface of the strut 1.

The annular groove 13 is connected to an annular chamber 17 by a balance channel 16 occupying the side wall of the strut 1. The bottom portion of the annular chamber 17 is delimited by the top end of the sealing bearing 12, its top end is delimited by a shoulder on the sliding rod 4, and its sides are delimited by the strut and the sliding rod, The annular chamber communicates with the inside of the sliding rod via orifices 28 which, in the example shown, are fitted with non-return valves 18 for providing throttling during extension. A cock 19 is mounted in the balance channel 16 in order to enable it to be closed at will, and the cock includes a control rod which projects outside the strut 1.

The shock absorber also includes, in conventional manner, a dipping rod 20 fixed to the inside of the strut 1 and including a throttling partition 21 at its bottom end having a central opening through which a throttling rod 22 on the sliding rod 4 may be engaged.

The base 23 of the sliding rod serves as an abutment for limiting the maximum penetration stroke of the sliding rod to a value which is determined as a function of the various parameters of the shock absorber. The distance between the support bearing 10 and the sealing bearing 12 is preferably greater than the maximum penetration stroke of the sliding rod 4. Should the outside surface of the sliding rod 4 be scratched while the shock absorber is in the extended position, such a scratch cannot then reach the bottom sealing ring 14 even when the sliding rod is at maximum penetration. This ensures that the shock absorbing liquid cannot escape via such scratches.

In the position shown in FIG. 1, the cock 19 is in its open position and the dynamic sealing ring 14 is thus subjected to balanced pressure since the annular groove 13 is at the same pressure as the annular throttling chamber 17 by virtue of the balance channel 16. In this position, it is only the bottom dynamic sealing ring 14 which is called on to provide sealing. When it is observed that the bottom dynamic sealing ring 14 is worn, e.g. by virtue of a small seepage of shock absorbing liquid, the cock 19 is closed. This brings the top dynamic sealing ring 14 into operation which takes over from the bottom sealing ring. In this context, it may be observed that these sealing rings are subjected to reduced shear force since the major portion of the shear force to which the sliding rod is subjected is absorbed by the support bearing 10.

Figure 2:
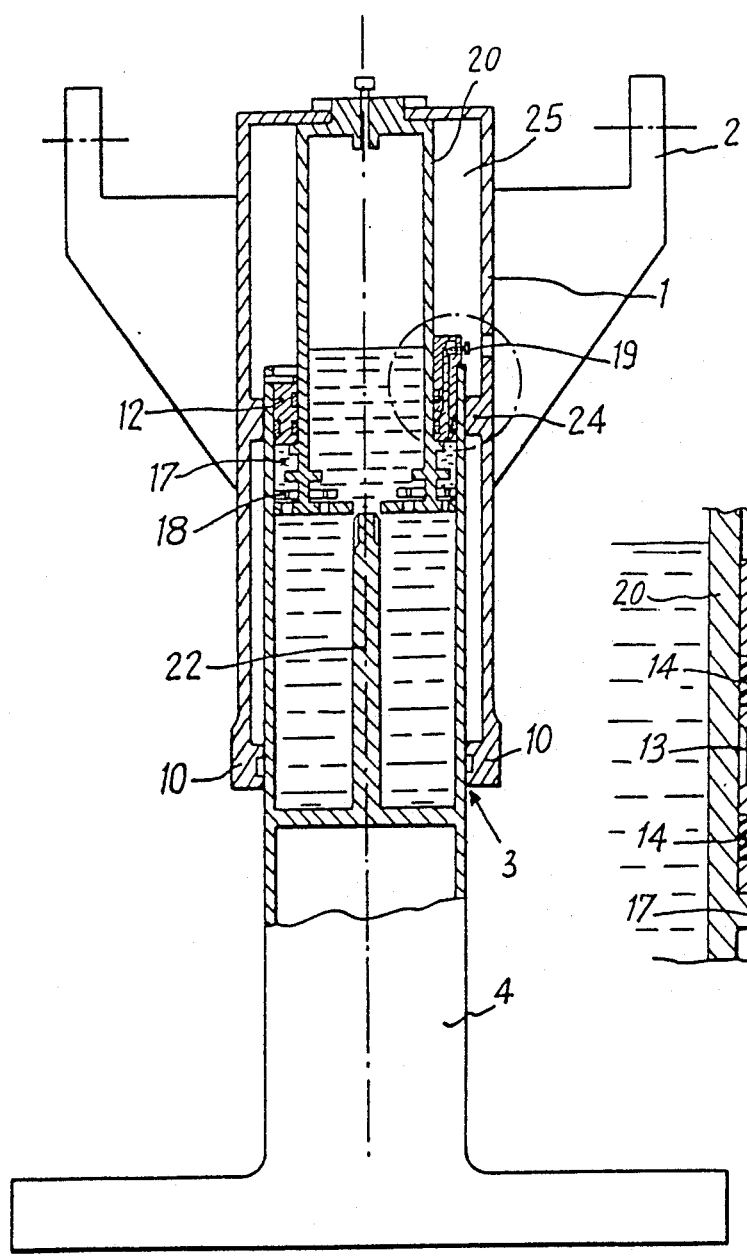
FIG. 2 is a view similar to FIG. 1 through a second embodiment of the invention.
Figure 3:
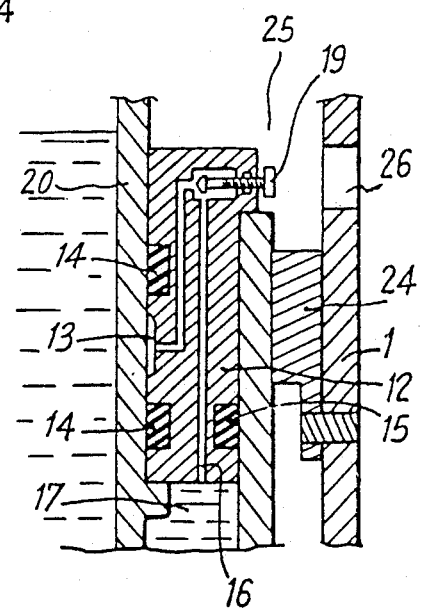
FIG. 3 is a fragmentary view on a larger scale of the portion of FIG. 2 contained in a circle.

FIGS. 2 and 3 show another embodiment of a shock absorber in accordance with the invention. Parts therein which are identical in function to those of FIG. 1 have been given identical reference numerals. The difference relative to the embodiments shown in FIG. 1 lies in the fact that the sealing bearing 12 is now carried by the sliding rod and the dynamic sealing rings are now in contact with the outside surface of the dipping rod 20. The annular chamber 17 is thus provided beneath the sealing bearing 12, between said bearing and a flange extending the throttling partition 21 radially outwardly relative to the dipping tube 20. The strut now includes a first support bearing 10 and a second support bearing 24 disposed about halfway up the strut 1 but without any sealing system.

As can be seen in greater detail in FIG. 3, the head of the cock 19 extends into an intermediate space 25 between the strut 1 and the dipping rod 20, and the strut includes a side opening 26 providing access to the head of the cock 19 for manuevering it. The lateral opening 26 in the strut is preferably disposed at the level occupied by the head of the cock 19 when the shock absorber is under an average static load. This makes it easy to bring the head of the cock 19 level with the opening 26 by small adjustments to the inflation pressure of the internal volume 6.

Naturally, the invention is not limited to the embodiments described, and variants can be made thereto without going beyond the scope of the invention. In particular, although the cocks 19 are shown as being in the form of needle screws, other means may be provided for closing the balance channel 16, e.g. systems based on plugs, slides, or balls. Although the annular chamber 17 is fitted in both embodiments shown with non-return valves 18 for extension throttling, the invention also applies to shock absorbers in which the annular chamber is in substantially free communication with the shock absorbing liquid 7.

We claim:

1. A shock absorber comprising a strut having an opening in which a sliding rod is mounted, said rod and strut delimiting an internal volume containing a gas under pressure and a shock absorbing liquid, means for delimiting an annular chamber which is variable as a function of the degree to which the sliding rod penetrates into the strut and which communicates with the internal volume, at least one support bearing fixed with the strut and located between the strut and the sliding rod in the vicinity of the opening of the strut, and a sealing bearing operatively positioned between the strut and the sliding rod at a distance from the support bearing and disposed at a level corresponding to a top portion of the sliding rod when the shock absorber is in the extended position, the annular chamber defined by one side of the sealing bearing, the sliding rod, and the strut, wherein the sealing bearing is provided with at least two sealing rings thereon that are separated by a groove in the sealing bearing that is connected to the annular chamber via a balance channel defined within said strut, the balance channel includes shut-off means that is accessible from outside the strut, and said sealing bearing is connected with said strut so that said sealing rings are carried by the strut to make contact with an outside surface of the sliding rod.

2. A shock absorber according to claim 1, wherein said sealing bearing is at a distance from the support bearing which is not less than the maximum stroke of the sliding rod.

3. A shock absorber comprising a strut having an opening in which a sliding rod is mounted, said rod and strut delimiting an internal volume containing a gas under pressure and a shock absorbing liquid, means for delimiting an annular chamber which is variable as a function of the degree to which the sliding rod penetrates into the strut and which communicates with the internal volume, at least one support bearing fixed with the strut and located between the strut and the sliding rod in the vicinity of the opening of the strut, and a sealing bearing operatively positioned between the strut and the sliding rod at a distance from the support bearing and disposed at a level corresponding to a top portion of the sliding rod when the shock absorber is in the extended position, wherein the sealing bearing is provided with at least two sealing rings thereon that are separated by a groove in the sealing bearing that is connected to the annular chamber via a balance channel defined within said sealing bearing, the balance channel includes shut-off means that is accessible from outside the strut, and said sealing bearing is connected with said sliding rod so that said sealing rings are carried by the sliding rod to make contact with a dipping rod which is fixed to the strut, the annular chamber defined by one side of the sealing bearing, the sliding rod, and the dipping rod, wherein the balance channel shut-off means extends into an intermediate space between the strut and the dipping rod, and wherein the strut includes a lateral opening.

4. A shock absorber according to claim 3, wherein the lateral opening in the strut is disposed at a level corresponding to the level of the shut-off means when the shock absorber is subjected to an average static load.

* * * * *